United States Patent [19]

Ishii et al.

[11] Patent Number: 4,805,160

[45] Date of Patent: Feb. 14, 1989

[54] DATA TRANSMISSION METHOD FOR OCEAN ACOUSTIC TOMOGRAPHY

[75] Inventors: Shin-ichi Ishii; Gentaroh Kai; Toshiaki Hara, all of Yokohama; Iwao Nakano, Tokyo, all of Japan

[73] Assignee: Japan Marine Science & Technology Center, Kanagawa, Japan

[21] Appl. No.: 89,983

[22] Filed: Aug. 27, 1987

[30] Foreign Application Priority Data

Sep. 10, 1986 [JP] Japan .............................. 61-213293

[51] Int. Cl.$^4$ .......................... G01V 1/00; G01V 1/22; H04B 13/02

[52] U.S. Cl. ...................................... 367/134; 367/15; 367/77; 367/3; 455/12; 455/40

[58] Field of Search ................. 367/6, 76, 77, 79, 117, 367/134, 5, 3; 455/40, 12; 342/353

[56] References Cited

U.S. PATENT DOCUMENTS

| | | | |
|---|---|---|---|
| 3,641,432 | 2/1972 | Bond | 455/12 |
| 3,886,494 | 5/1975 | Kostelnicek et al. | 367/77 |
| 4,309,763 | 1/1982 | Passmore et al. | 367/77 |
| 4,446,542 | 5/1984 | Beckerle | 367/131 |

OTHER PUBLICATIONS

Nagata, Y., "On the Structure of Shallow Temperature Inversions," J. Oceanographic Soc., Jpn. vol. 23(5) 1967.

Hara et al., "Continuous Temperature Observation along the Surface Layer of the Uchinoura Strait," JAMSTECTR, vol. 6.

Hara et al., "Development of an Inductive-Coupled thermocline Instrumentation System," JAMSTECTR, vol. 9, 1982.

Sitnikov et al., "Inductive Coupling with Steel Towing Cable," Mar. Technol. Soc. J., vol. 9(10) 1975.

Nagasaka, K., "An STD System for Instrumented Buoy," Oceanogr Mag., vol. 23(1), 1971.

R. Bo et al., "Sensor Chains for Oceanographic Profiling," J. Soc. Underwater Technol., vol. 8(4), 1982.

Nomoto et al., "Development of an Underwater Sliding Vehicle for Oceanographic Meas.," Proc. Oceans 81, 1981.

*Primary Examiner*—Nelson Moskowitz
*Assistant Examiner*—Ian J. Lobo

[57] ABSTRACT

The present invention enables tomography data in the sea to be collected and transmitted via an artificial satellite to a ground station. Accordingly, data on the Doppler phenomenon and shift of a sound wave is also obtainable based on the temperature and density of sea water and an ocean current. This makes it possible to obtain information about a wide sea area, such as the relationship between the KUROSHIO and the El ninô which is now attracting attention in relation to fishery, agriculture and abnormal weather. Hence, the present invention will be of wide application.

7 Claims, 7 Drawing Sheets

FIG.1

1: FRONT
OCEAN SPACE
T: ACOUSTIC TRANSDUCER
R: ACOUSTIC RECEIVER
2: EDDY

DATA TRANSMISSION METHOD FOR OCEAN ACOUSTIC TOMOGRAPHY

BACKGROUND OF THE INVENTION

1. Field of the Invention

The present invention relates to a data transmission method for ocean acoustic tomography and, more particularly, to a system by which data obtained with a wide area ocean acoustic tomography system is appropriately transmitted to a ground station via a mooring repeater and an artificial satellite.

2. Description of the Prior Art

A sound wave travelling in the sea contains information about physical properties of the ocean. Accordingly, clarification of the influence of physical properties of the ocean on acoustic signals will make it possible to derive therefrom information about the ocean. The principle of the ocean acoustic tomography is based on a simple fact that the information about physical properties of the ocean is contained in the structure of the sound field which travels in the sea. Since the sound speed in the sea depends largely upon the temperature, salinity and density (pressure) of seawater, the travel time of the sound wave reflects the states of these physical parameters. Accordingly, the states of the physical parameters of the ocean (i.e. the ocean structure) can be presumed by an inversion method or inverse calculation from the travel time of the sound wave.

The sound speed in the sea is related to the temperature, salinity and pressure of seawater. For example, according to "Acoustical Oceanography Principle and Applications", Clarence S. Clay and Herman Medwin, 1972, the sound speed C (m/s) depends upon the following equation:

$$C = 1449.2 + 4.6T - 0.055T^2 + 0.00029T^3 + (1.34 - 0.017)(S-35) + 1.58 \times 10^{-6} Pa$$

where T is water temperature (C°), S salinity (%), and Pa gage pressure (N/m$^2$).

According to another publication ("Introduction to Acoustical Engineering", Revised Edition, published by Nikkan Kogyo Shimbunsha), $$C = 1410 + 4.21t - 0.037t^2 + 1100S + 0.018d$$

where t is water temperature (C°), S salinity (Kg weight of salt contained in 1 Kg of seawater), and d is the depth of water (m).

Figure 1:
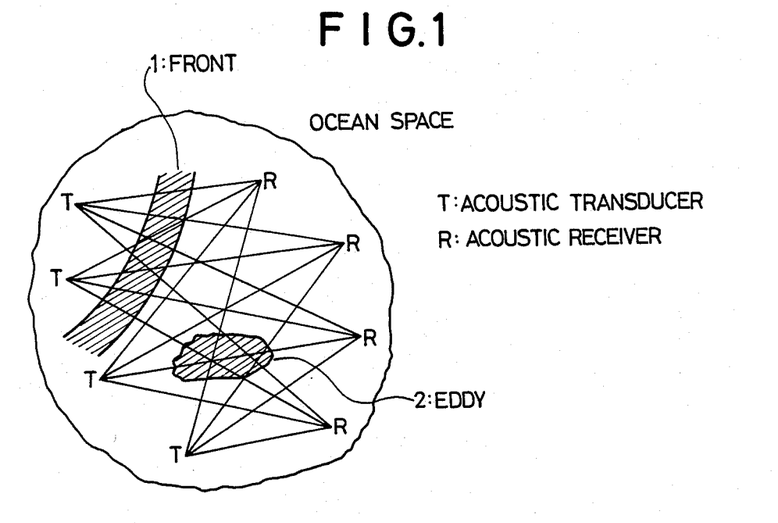
FIG. 1 is a schematic diagram for explaining the principle of the ocean acoustic tomography.
Figure 2:
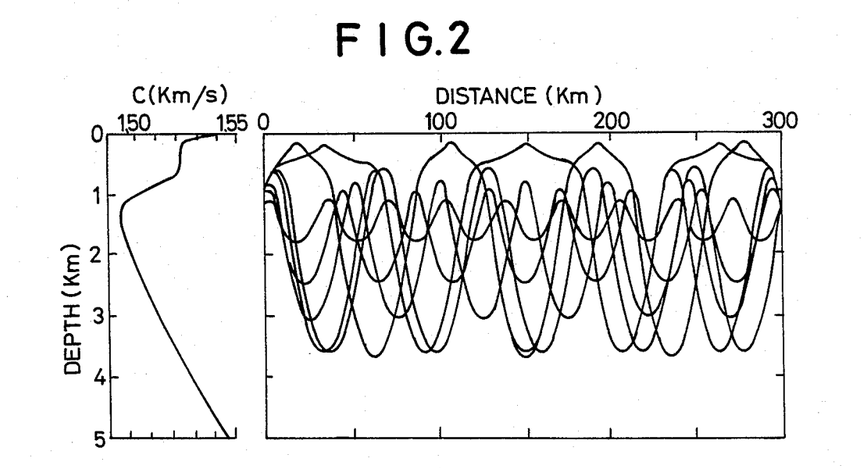
FIG. 2 is a graph showing, by way of example, a sound speed profile and sound ray paths between a transmitter and a receiver disposed 300 Km apart.

Munk and Wunsch have proposed an ocean acoustic tomography system which utilizes acoustic transmission. With this system, meso-scale ocean variability covering a spatical expanse over several hundred kilometers in the ocean can be presumed by measuring the travel time of each of acoustic pulses which are transmitted between acoustic transducers T and acoustic receivers R disposed at observation points in the ocean as shown in FIG. 1. That is, oceanic phenomena such as a front 1 and an eddy 2 in the ocean space can be presumed. A sound speed profile in seawater has a sound speed minimum layer at a certain depth. Namely, since the salinity of seawater in a certain sea area can be regarded as constant, only the temperature and pressure of seawater need to be taken into account. When the pressure is fixed, higher the water temperature, the higher the sound speed. When the water temperature is fixed, the higher the pressure, the higher the sound speed. As the depth of water increases, the water temperature decreases and the pressure increases. In medium latitudes the sound speed minimum layer exists at a depth of 1000 m or so. Since a sound wave travels while being refracted toward layers of lower sound speeds, it travels along the sound speed minimum layer. FIG. 2 shows, by way of example, the sound speed profile and sound ray paths (obtained by simulation) between a transmitter and a receiver disposed 300 Km apart. In a sea area more than 4000 m deep, sound can be propagated stably over a long distance without reflection by the sea bottom and the sea surface.

Figure 3A:
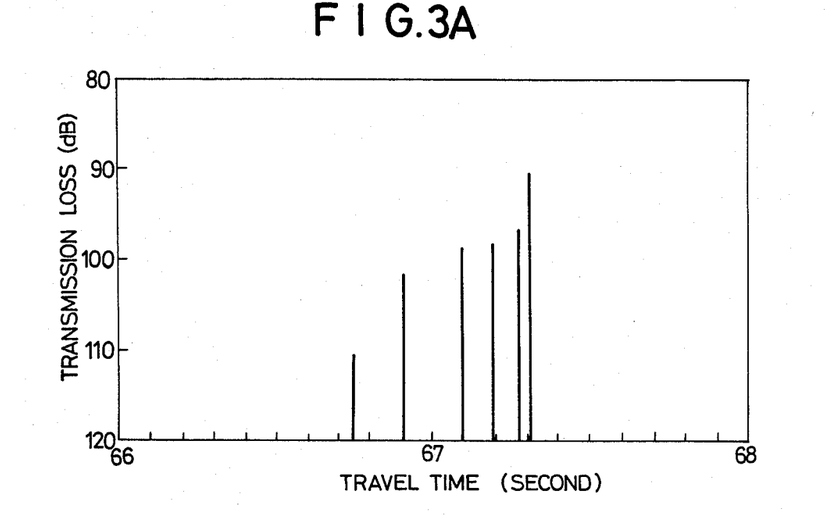
FIGS. 3A and 3B are graphs showing, by way of example, transmission loss-travel time characteristics of sound pulses travelling between transmitter and a receiver disposed 100 Km apart and sound path rays therebetween.
Figure 3B:
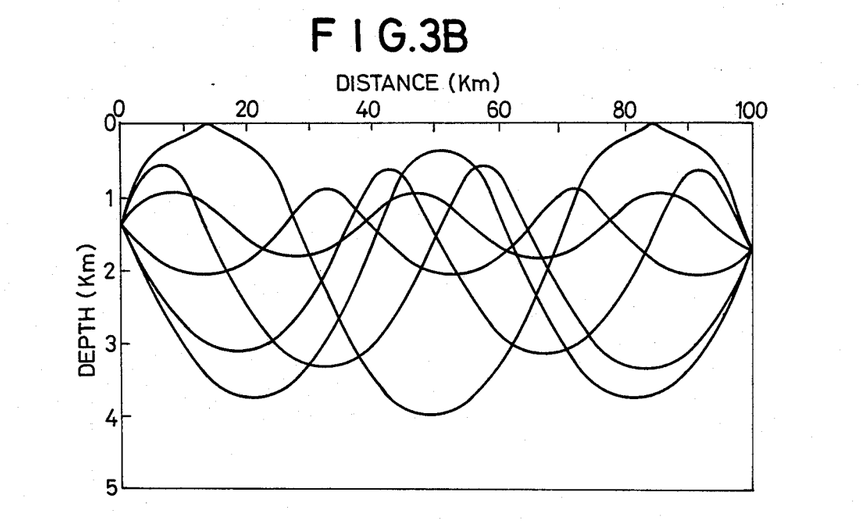

FIGS. 3A and 3B show, by way of example, transmission loss-travel time characteristics of acoustic pulses travelling between a transmitter and a receiver disposed 100 Km apart and sound ray paths (obtained by simulation) between them in the case where the pulse frequency is 220 Hz and the acoustic source and receiver are disposed at depths of 1.35 and 1.75 Km, respectively.

Figure 4:
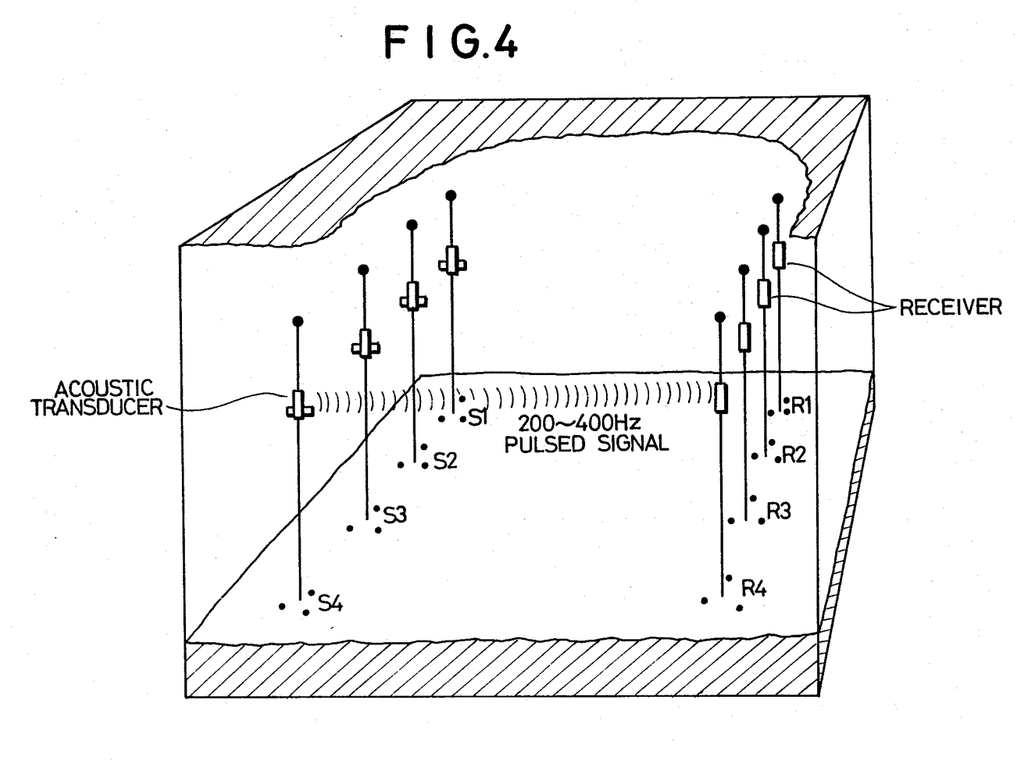
FIG. 4 is a schematic diagram illustrating the positional relationship between acoustic transducers and receivers in a prior art system.

In 1981 an experiment was conducted in the southern part of the North Atlantic (see "OCEAN ACOUSTIC TOMOGRAPHY: A New Measuring Tool", OCEANUS 25-2, pp. 12-21, 1982, for example). In this experiment a sound velocity distribution was obtained in a sea area 300 Km around. FIG. 4 schematically shows the positional relationship between acoustic transducers and receivers used in the experiment. In this instance the acoustic transducers transmit pulse signals of a 200 to 300 Hz frequency and the transmitted data is received by (and recorded in) the acoustic receivers and is analyzed after recovery thereof. That is, this conventional system involves the necessity of recovering the receivers from the sea prior to the analysis of the measured data. Further, since no data is accessible during measurement, it is impossible to know parameters such as the direction of an ocean current, water temperature, etc. as well as the operating conditions (including troubles) of the acoustic transducers and receivers.

Moreover, there has been proposed an underwater data collecting method according to which a signal sent from a submersible buoy (a submersible drifting buoy) is received by a repeating buoy and thence transmitted in the form of an electric wave (Japanese Pat. Pub. Disc. No. 92153/78). However, the submersible buoy for use in this method is a drifting buoy which is designed to stay at a certain depth of water without employing a mooring rope, and data available by this method is not acoustic tomography data.

SUMMARY OF THE INVENTION

It is an object of the present invention to provide a system in which pluralities of acoustic transducers and transmitter-receivers are fixedly arranged in the sea through use of sinkers or the like and tomography data from the transmitter-receivers is received via receiving signal conversion equipment of a mooring repeater and is transmitted therefrom to a ground station in real time.

Another object of the present invention is to provide a system which transmits, in the form of an electric wave, data from a real time data transmission buoy to a ground station via an artificial satellite.

According to the present invention, the acoustic receivers of the prior art mentioned above are employed as tomography data (TD) transmitter-receivers and data transmitted therefrom in the sea is received by the mooring repeater. The receiving signal conversion equipment provided in the mooring repeater have a one-to-one or one-to-two-or-more correspondence with the TD transmitter-receivers. The data received by the mooring repeater is transmitted from the receiving signal conversion equipment via a transmission cable to the real time data transmission buoy, from which it is transmitted, as an electric wave, to the ground station via the artificial satellite.

The tomography data transmitter-receiver receives underwater acoustic tomography data from the acoustic transducer (an acoustic source). By employing a transmitter-receiver as the acoustic transducer, information about the direction and speed of an ocean current is also obtainable; namely, both one-way and two-way measurements can be achieved.

BRIEF DESCRIPTION OF THE DRAWINGS

FIG. 8 is a diagram for explaining the mode of communication between the receiving signal conversion equipment and the TD transmitter-receiver in the embodiment depicted in FIG. 5, FIG. 8A showing an address and FIG. 8B the data format used.

DESCRIPTION OF THE PREFERRED EMBODIMENTS

Figure 5:
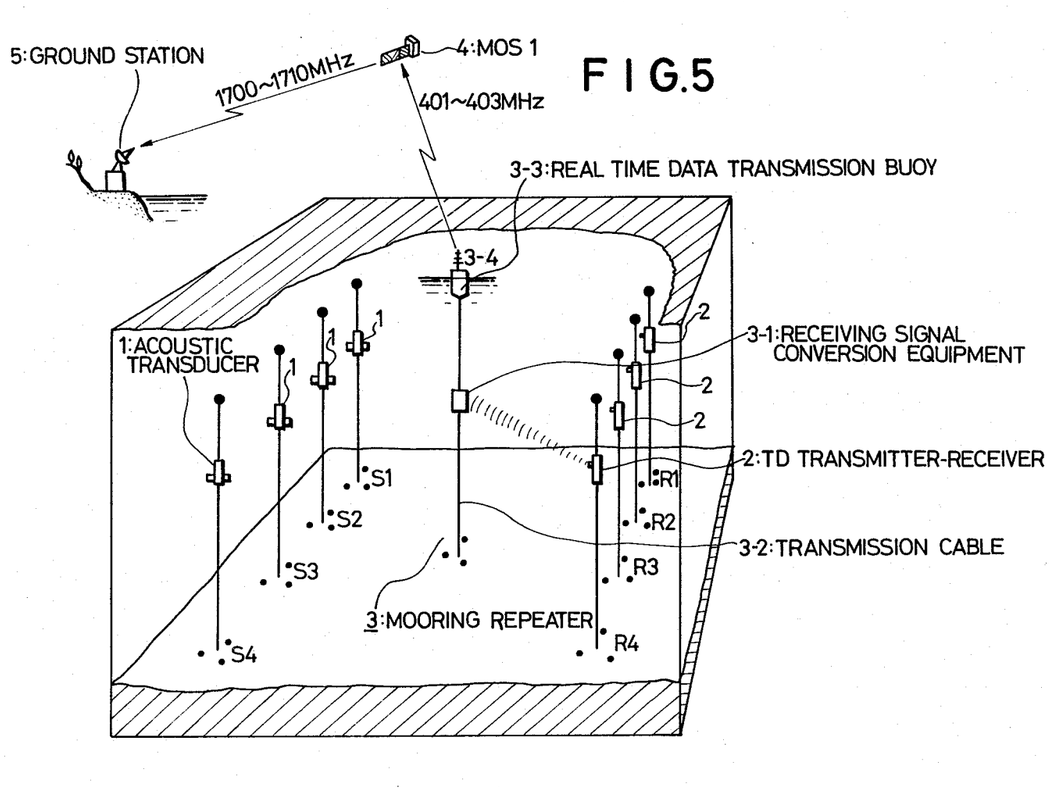
FIG. 5 is a schematic diagram illustrating the system configuration of an embodiment of the present invention.

FIG. 5 illustrates an embodiment of the present invention. Reference character 1 indicates a plurality of acoustic transducers fixed to sinkers S1, S2, S3 and S4, respectively, 2 a plurality of TD (tomography data) transmitter-receivers fixed to sinkers R1, R2, R3 and R4, respectively, 3 a mooring repeater fixed to a sinker, 3-1 receiving signal conversion equipment, 3-2 a transmission cable, 3-3 a real time data transmission buoy, 3-4 an antenna for transmission to an artificial satellite (MOS 1, for example) 4, and 5 a ground station. The acoustic sources that are constituted by the acoustic transducers 1 are fixed to a sofar channel. It is considered from FIG. 2, that the acoustic transducers 1 be held at a depth of approximately 1300 m. The acoustic transducers 1 and the transmitter-receivers 2 (about 1750 m) are fixed at known depths. A sound wave from each acoustic transducer 1 is received, as underwater tomography (TD) data, by one of the TD transmitter-receivers 2. The data received by the TD transmitter-receiver 2 is transmitted therefrom to the mooring repeater 3. The data contains the address of the TD transmitter-receiver 2, the time of arrival thereon of the sound pulse, the pulse receiving level, and so forth. The frequency of the sound wave is in the range of 200 to 400 Hz, and the most preferred communication system for use in this embodiment is an FSK communication system. The receiving signal conversion equipment 3-1 of the mooring repeater 3 and the TD transmitter-receivers 2 have a one-to-one or one-to-more-than-one correspondence, and the data transmission system therebetween can be implemented by (1) a fixed time communication system, (2) a transmission system of the type that the repeater 3 accesses the transmitter-receivers 2, and (3) other systems. The transmission from the receiving signal conversion equipment 3-1 to the transmission buoy 3-3 is real time data transmission, and data is transmitted by (1) an inductive coupling transmission method in which no contact is made with the cable, (2) a transmission method which uses an underwater connector for contact with the cable, or (3) an optical fiber transmission method. The data transmission between the real time data transmission buoy 3-3 and the artificial satellite 4 is performed using an electric wave of about 401 to 403 MHz. A communication system employing an electric wave of 1700 to 1710 MHz can be used for communication between the artificial satellite 4 and the ground station 5. As regards the data transmission by the artificial satellite MOS 1, refer to "First Ocean Observation Satellite (MOS 1) --Summary--", the Space Development Corporation of Japan, Apr. 1984, for example.

Figure 6:
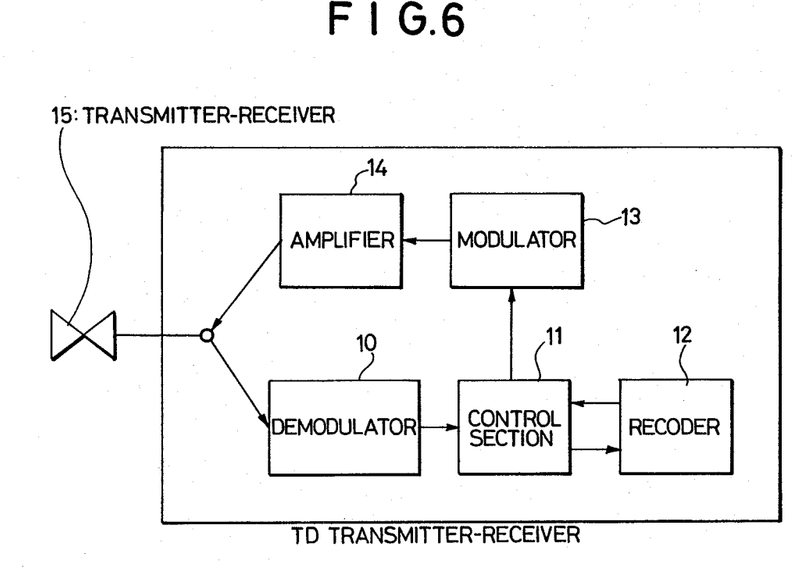
FIG. 6 is a block diagram for explaining the principle of the TD transmitter-receiver for use in the present invention.

FIG. 6 is a diagram for explaining the principle of the TD transmitter-receiver. Reference numeral 10 a demodulator, 11 a control section, 12 a recoder, 13 a modulator, 14 an amplifier, and 15 a transmitter-receiver. A pulse wave (an acoustic pulse) received by the transmitter-receiver 15 is demodulated by the demodulator 10 into an electric signal, and the time of the peak of the pulse and the receiving level are recorded by the recorder 12 such as an IC memory, under control of the control section. The data thus recorded is transmitted in the following manner: In the case of employing a fixed time transmission system, the data is subjected to an FSK sound wave modulation (by the modulator 13) and is amplified (by the amplifier 14), thereafter being transmitted from the transmitter-receiver 15 at each fixed time. In the case of a call-answer system, a calling call wave from the receiving signal conversion equipment 3-1 is received by the transmitter-receiver 15 and is demodulated (by the demodulator 10) into an electric signal. When the address of the received signal coincides with the address of the TD transmitter-receiver 2, the afore-mentioned data is subjected to the FSK sound wave modulation (by the modulator 13) and is amplified, thereafter being transmitted from the transmitter-receiver 15.

Figure 7:
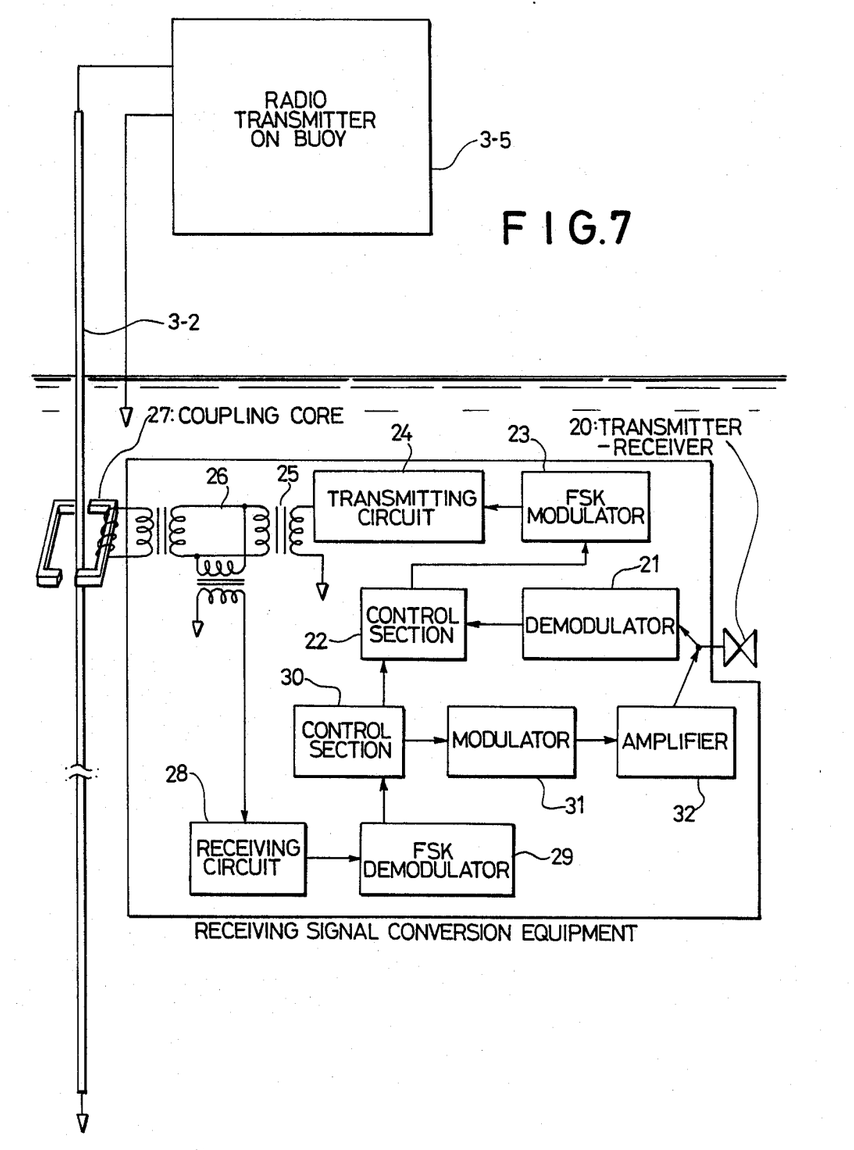
FIG. 7 is a block diagram for explaining the principle of the receiving signal conversion equipment for use in the present invention.

Turning next to FIG. 7, the principle of the receiving signal conversion equipment will be described. The receiving signal conversion equipment shown in FIG. 7 adopts an inductive coupling transmission method employing a coupling core. This method has been put to practical use as disclosed in, for example, Hara et al., "Tests of Experimentally Produced Inductive Coupling Transmission Type Water Temperature Measuring Instrument", JAMSTEC TR (9), 112–120, 1982 and Hara et al., "Trial Manufacture and Experiments of Inductive Coupling Transmission Type Simple Sensor for Multi-layer Observation", JAMSTEC TR (12), 77–87, 1984. In FIG. 7 reference numeral 20 indicates a transmitter-receiver, 21 a demodulator, 22 a control section, 23 an FSK modulator, 24 a transmitting circuit, 25 a transformer, 26 a hybrid coil, 27 a coupling core, 3-2 a transmission cable, 3-5 a radio transmitter on buoy, 28 a receiving circuit, 29 an FSK demodulator, 30 a control section, 31 a modulator, and 32 an amplifier. In the case of the fixed time system, data of a non-command signal which is transmitted from the TD transmitter-receiver 2 (FIG. 5) at each fixed time is received by the transmitter-receiver 20 and demodulated by the demodulator 21 into the corresponding electric signal. The electric signal is subjected to digital processing such as serial-to-parallel conversion by the control section 22 and then the FSK modulation by the FSK modulator 23, thereafter being applied to the transmitting circuit 24. The digital data thus obtained is transmitted, by virtue of inductive coupling, over the transmission cable 3-2 to the radio transmitter of the real time data buoy 3-5 via the transformer 25 and the coupling core 27.

In the case of the call-answer system, there are two methods such as follows:

(1) A command signal (the address of the TD transmitter-receiver by FSK) from the radio transmitter on buoy 3-5 is received by the receiving circuit 28 via the coupling core 27 through utilization of the inductive coupling method. The received command signal is demodulated by the FSK demodulator 29 into an FSK signal for transmission, which is provided via the control section 30 to the modulator 31, wherein it is subjected to the FSK sound wave modulation, and it is amplified by the amplifier 32, thereafter being transmitted from the transmitter-receiver 20.

(2) The receiving signal conversion equipment 3-1 (FIG. 5) independently transmits the address of the TD transmitter-receiver 2.

The sound wave thus transmitted specifies the address of a required one of the TD transmitter-receivers 2, causing it to send tomography data to the receiving signal conversion equipment 3-1.

Next, a description will be given of the communication between the receiving signal conversion equipment and the TD transmitter-receivers. The communication between them employs the FSK modulation (Frequency Shift Keying modulation) using two frequencies.

Figure 8A:
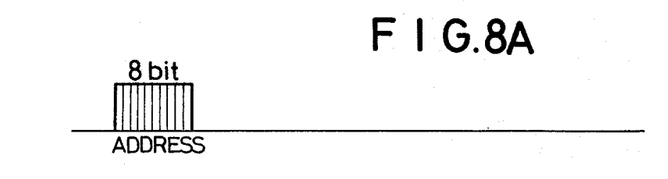
Figure 8B:
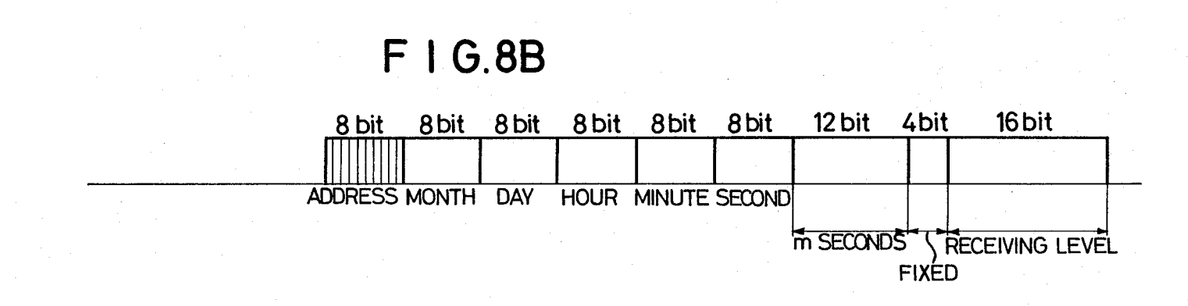

FIGS. 8A and 8B show an example of a data signal, for explaining the communication. The receiving signal conversion equipment calls the TD transmitter-receiver by transmitting its address composed of eight bits (FIG. 8A). If now bits "0" and "1" are defined to correspond to a frequency of 400 Hz, a time width of 10 msec a and frequency of 200 Hz, a time width of 10 msec, respectively, the 8-bit address and the shown data permit the definition of appreciable quantities of data. When its address is specified, the TD transmitter-receiver transmits to the receiving signal conversion equipment data of such a format as shown in FIG. 8B. That is, the data is composed of the address (8 bits) of the specified TD transmitter-receiver, month (8 bits), day (8 bits), hour (8 bits), minute (8 bits), second (8 bits), millisecond (12 bits), fixed (4 bits), and the receiving level (16 bits). As mentioned above, the frequency and time width corresponding to the bit "0" are 400 Hz and 10 msec and the frequency and time width corresponding to the bit "1" are 200 Hz and 10 msec, respectively.

As described above, underwater tomography data is obtainable with pluralities of acoustic transducers and TD (tomography data) transmitter-receivers arranged in the sea in two files at a certain distance, and the data is transmitted in digital form to the receiving signal conversion equipment of the mooring repeater for transmission to a ground station. While the embodiment shown in FIG. 5 has been described in connection with the case of performing one-way measurement through use of the acoustic transducers 1 and the TD transmitter-receivers 2, it is evident that by employing transmitter-receivers in place of the acoustic transducers 1, two-way measurement can also be achieved for obtaining data about the direction and speed of an ocean current. The control sections of the acoustic transducers and the transmitter-receivers each include a high precision clock for maintaining the timing precision of data.

Although in the above embodiment of the present invention the mooring repeater is fixed for collecting predetermined data, it is a matter of course that earthquake information and data such as the temperature, salinity, flow direction, and flow speed of sea water could be obtained by providing various sensors on the mooring repeater.

As described above, the present invention permits the collection of tomography data in the sea and its transmission to a ground station via an artificial satellite; and so that data such as a water temperature profile, the direction of an ocean current and its dirft profile over a wide sea area is available on a real time basis. That is to say, the present invention makes it possible to obtain information about a wide sea area, such as the relationship between the KUROSHIO and the El nino phenomenon which is now attracting attention in relation to fishery, agriculture, and abnormal weather. Hence, the present invention will be of wide application.

It will be apparent that many modifications and variations may be effected without departing from the scope of the novel concepts of the present invention.

What is claimed is:

1. An ocean acoustic tomography data transmission system, comprising:
   a plurality of acoustic transducers arranged in a first file in the sea;
   a plurality of tomography data transmitter-receivers arranged in the sea in a second file spaced from said first file, said receivers receiving acoustic signals from said acoustic transducers and transmitting said signals into tomography data electric signals;
   a floating fixed buoy arranged in the sea remote from said second file and supporting thereon a mooring repeater including radio transmission means, a transmission cable suspended from said buoy and connected to said radio transmission means, and receiving signal conversion means provided on said transmission cable and receiving said tomography data electric signals from said transmitter-receivers to transmit them to said radio transmission means;
   ocean observation satellite means; and
   a ground station, said data signals being transmitted from said transmission means to said ground station by said ocean observation satellite means.

2. A transmission system according to claim 1, wherein said receiving signal conversion means includes FSK modulation means.

3. A data transmission method for ocean acoustic tomography, comprising the steps of providing a plurality of acoustic transducers arranged in a first file in the sea; providing a plurality of tomography data transmitter-receivers arranged in the sea in a second file spaced from said first file and receiving acoustic signals from said transducers to transmit said signals into tomography data electric signals; and providing a mooring repeater with radio transmission means on a floating fixed buoy arranged in the sea remote from said transmitter-receivers and receiving said data electric signals therefrom so as to transmit said data signals to a ground station via an ocean observation satellite.

4. A transmission method according to claim 3, wherein data transmission from said receiving signal conversion means to said radio transmission means is carried out by an inductive coupling transmission method.

5. A transmission method according to claim 3, wherein data transmission from said receiving signal conversion means to said radio transmission means is carried out by an underwater connector for contact with a cable connected to said radio transmission means.

6. A transmission method according to claim 3, wherein data transmission from said receiving signal conversion means to said radio transmission means is carried out by an optical fiber transmission method.

7. A transmission method according to claim 3, wherein said radio transmission means is a real time data transmission means and data transmission between said real time data transmission means and said observation satellite is performed using an electric wave of about 401 to 403 MHZ.

* * * * *